(12) United States Patent
Stith (10) Patent No.: US 8,991,640 B2
(45) Date of Patent: Mar. 31, 2015

(54) EXTENDING POT

(76) Inventor: Sharay Valesse Stith, Stewartsville, NJ (US)

( * ) Notice: Subject to any disclaimer, the term of this patent is extended or adjusted under 35 U.S.C. 154(b) by 266 days.

(21) Appl. No.: 13/585,523

(22) Filed: Aug. 14, 2012

(65) Prior Publication Data

US 2014/0050833 A1    Feb. 20, 2014

(51) Int. Cl.
| A47J 27/00 | (2006.01) |
| A23L 1/01 | (2006.01) |
| A47J 27/12 | (2006.01) |
| A47J 36/06 | (2006.01) |
| A47J 45/06 | (2006.01) |

(52) U.S. Cl.
CPC .. *A23L 1/01* (2013.01); *A47J 27/12* (2013.01); *A47J 36/06* (2013.01); *A47J 45/06* (2013.01)
USPC ...................................... 220/573.1; 220/4.26

(58) Field of Classification Search
USPC ............. 220/573.1, 4.26, 212.5, 772, 8, 4.03, 220/912
See application file for complete search history.

(56) References Cited

U.S. PATENT DOCUMENTS

| 561,167 | A | * | 6/1896 | Jennings | ............................ 220/8 |
| 848,698 | A | * | 4/1907 | Smith | .......................... 220/4.03 |
| 991,322 | A | * | 5/1911 | Kimball | ........................... 73/429 |
| 2,546,452 | A | * | 3/1951 | Kmieliauskas | ................. 84/412 |
| 2,623,657 | A | * | 12/1952 | De Vries | ....................... 220/298 |
| 2,834,502 | A | * | 5/1958 | Trojan | ............................... 220/8 |
| 3,641,926 | A | * | 2/1972 | Williams et al. | ................. 99/448 |
| 4,222,493 | A | * | 9/1980 | Friedman | ........................... 220/8 |
| 4,574,776 | A | * | 3/1986 | Hidle | ............................. 126/369 |
| 5,474,195 | A | * | 12/1995 | Pai | ................................. 220/4.26 |
| 5,662,026 | A | * | 9/1997 | Prakasa | ........................... 99/413 |
| D396,600 | S | * | 8/1998 | Otero | ............................. D7/356 |
| 6,443,053 | B1 | * | 9/2002 | Rossi | ............................. 99/340 |
| 6,588,616 | B1 | * | 7/2003 | Ho | ................................. 220/4.03 |
| 6,908,004 | B2 | * | 6/2005 | Barr | ............................. 220/4.26 |
| 7,617,948 | B2 | * | 11/2009 | Cheng | ......................... 220/573.1 |
| D639,108 | S | * | 6/2011 | Molayem | ....................... D7/356 |
| D639,109 | S | * | 6/2011 | Molayem | ....................... D7/356 |
| D641,201 | S | * | 7/2011 | Molayem | ....................... D7/356 |
| D682,010 | S | * | 5/2013 | Stith | .............................. D7/356 |
| 8,534,188 | B1 | * | 9/2013 | Winfield | ......................... 99/357 |
| 8,707,860 | B2 | * | 4/2014 | Difante | ........................... 99/413 |
| 2005/0109774 | A1 | * | 5/2005 | Orioles | ......................... 220/4.27 |
| 2007/0277807 | A1 | * | 12/2007 | Taban | ....................... 126/275 R |

\* cited by examiner

*Primary Examiner* — Anthony Stashick
*Assistant Examiner* — Ernesto Grano (57) ABSTRACT

The present invention is an extending pot that includes a pan, a first pot extension, a last pot extension, and a lid. The pan, first pot extension, and last pot extension each include threading which allows first pot extension to screw onto the pan and the last pot extension to screw onto the first pot extension. The pan includes a plurality of pan latches while the first pot extension and last pot extension each include a plurality of extension latches. The first pot extension and last pot extension each additionally include a plurality of latch catches. The pan latches or extension latches interface with the latch catches to help secure the first pot extension to the pan and the last pot extension to the first pot extension. The extending pan is thus easily assembled and allows users use a single piece of cookware when cooking food using multiple cooking techniques.

10 Claims, 9 Drawing Sheets

EXTENDING POT

FIELD OF THE INVENTION

The present invention relates generally to an apparatus for cooking. More specifically, the present invention is cookware with attachable sides which can increase the height of the cookware as necessary for various ingredients and cooking techniques.

BACKGROUND OF THE INVENTION

Pans and pots are an ubiquitous sight in kitchens. They provide the basic means for cooking foods, with a large variety of cookware having been developed to meet different purposes. One attribute of cookware that is commonly varied is size; different pots and pans will have different widths, and especially heights, to facilitate a certain method of cooking or simply to hold more food. Due to this, many people have a large stockpile of cookware, with different pieces suited to different purposes. Not only does this add clutter to the kitchen, but it requires the use of multiple pots and pans for recipes which combines cooking techniques. This adds to the time required for preparation before cooking, as well as cleanup after cooking.

There are some pots and pans that have removable sides in various implementations. A common use is to have the sides and bottom be two different pieces; however this generally applies to baking pans, and does not help with increasing the cookware size. Other pans have sides which can be attached to increase the height of the pan, but these sides have drawbacks. Some attachable sides are easy to install, but do not seal the edge of the pan and the side, making the extension unusable when cooking with liquids. Other sides form a more secure attachment, but take more time to set up. These sides can be used while cooking liquids, but would need to be prepared ahead of time. If using a recipe that calls for two methods of cooking, two pans or pots would still be needed.

It is therefore an objective of the present invention to provide an extending pot which can be used to cook with both solids and liquids. It is also an object of the present invention to provide an extending pot which can be quickly assembled during the cooking process.

DETAIL DESCRIPTIONS OF THE INVENTION

All illustrations of the drawings are for the purpose of describing selected versions of the present invention and are not intended to limit the scope of the present invention.

The present invention is an extending pot with extensions which allow the extending pot to be expanded in size during cooking, allowing the extending pot to accept a larger volume of food and other cooking ingredients. This extending pot comprises a pan 1, a first pot extension 8, a last pot extension 9, and a lid 16. The first pot extension 8 and last pot extension 9 have a ring shape, and attach to the extending pot to provide a larger volume as needed. The lid 16 covers the assembled extending pot.

Figure 1:
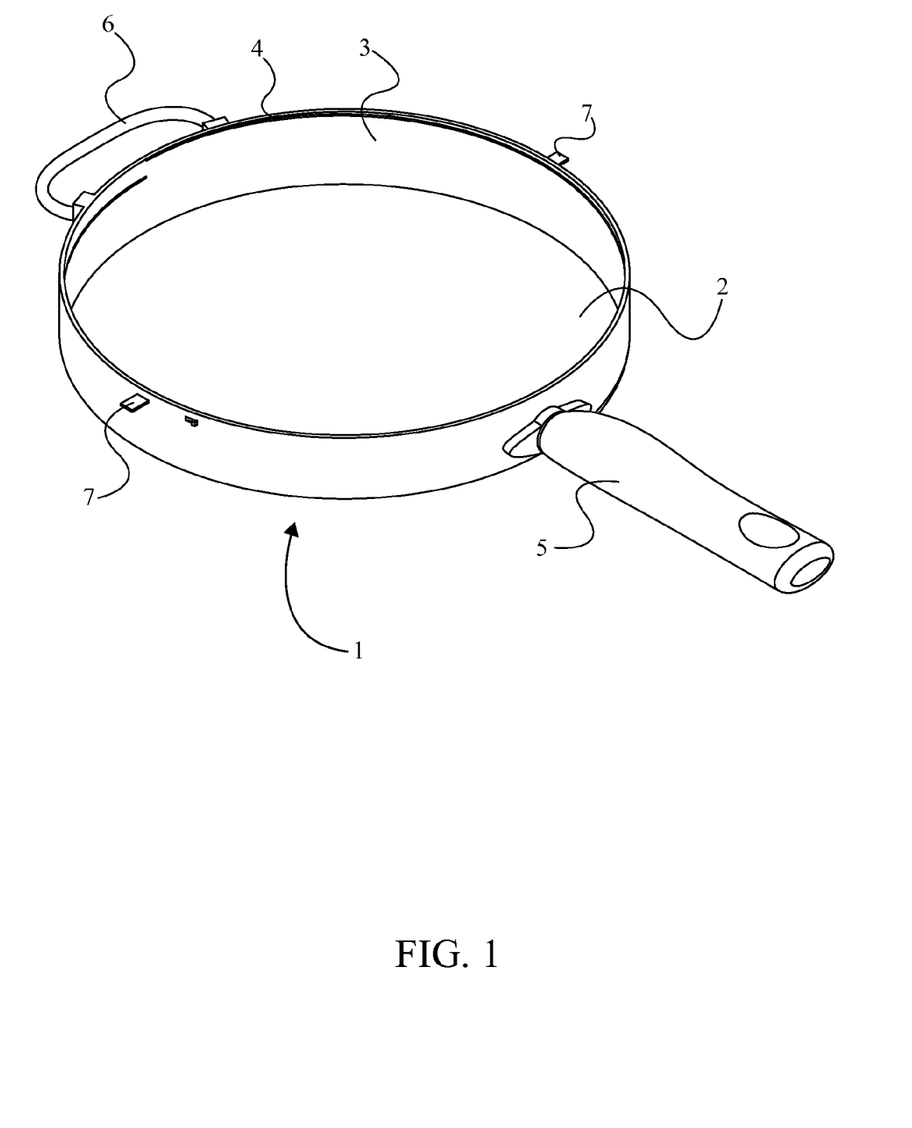
FIG. 1 is a perspective view of the pan of the present invention.

The pan 1, as illustrated in FIG. 1, further comprises a pan base 2, an annular pan wall 3, an elongated handle 5, a secondary handle 6, and a plurality of pan latches 7. The annular pan wall 3 is connected to the pan base 2, forming an open cylindrical shape. The elongated handle 5 and the secondary handle 6 are connected to the exterior of the annular pan wall 3, with the elongated handle 5 being connected to the annular pan wall 3 opposite to where the secondary handle 6 is connected to the annular pan wall 3. The positioning of the elongated handle 5 and secondary handle 6 allows a user to more easily pick up the present invention, especially when compared to cookware with a single handle. Having two handles allows a user to split the weight of the present invention between two hands, whereas a single handle would increase the weight supported by one hand, as well as generate torque, which is exacerbated when heavier ingredients are used. The plurality of pan latches 7 is connected to the exterior of the annular pan wall 3. The annular pan wall 3 further comprises a pan threading 4, located on the interior of the annular pan wall 3. The pan threading 4 is positioned adjacent to the upper edge of the annular pan wall 3, opposite the pan base 2.

In the preferred embodiment the pan base 2 and annular pan wall 3 will be constructed from a metallic material. Due to the nature of the present invention, heat resistant materials are essential; materials which can melt, such as plastic, should be avoided. The ideal material will be able to withstand temperatures of up to 500° Fahrenheit, sufficient to endure most cooking applications. Common materials used include copper, iron and steel. Given the need, materials with higher resistance can be used. The elongated handle 5 preferably has a long shape, such that it can be gripped with a single hand. The elongated handle 5 should be long enough that a user can comfortably hold the handle during cooking, with the hand unaffected from the heat source being used. Ideally the elongated handle 5 will be covered by a material with low thermal conductivity. This will help the elongated handle 5 remain cool during cooking, allowing a user to still operate the present invention without fear of burning their hands. Likewise, the secondary handle 6 should be coated with a material with low thermal conductivity. The secondary handle 6 preferably is U-shaped, but in other embodiments different forms, such as an extended handle similar to the elongated handle 5, can be used. The plurality of pan latches 7 will preferably be implemented as spring latches. A latch cover will cover the spring latch, keeping the spring latch compressed. The latch cover is laterally movable across the exterior of the annular pan wall 3. The latch cover can be moved by a switch, enabling the spring latch to expand and engage with a latch catch on the first pot extension 8. In other embodiments, a different method of restraining the pan latches 7 could be used. As with the handles, the switch should be made from a material with low thermal conductivity so that a user is able to operate the switch while cooking. Other types of pan latches 7, like draw latches, could be used in place of spring latches. The pan latch 7 serves to secure the pan 1 to the first pot extension 8; whatever type of pan latch 7 is used should be able to serve this function.

Figure 2:
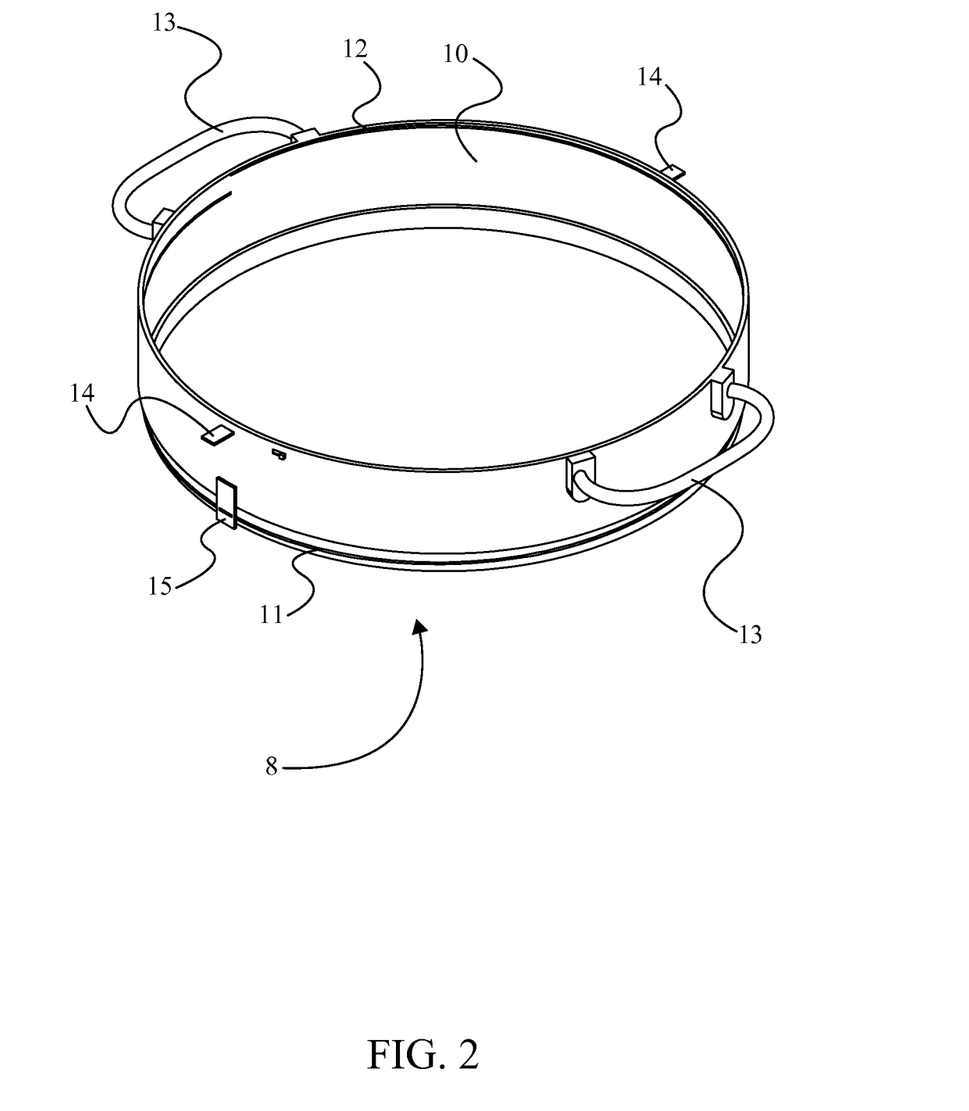
FIG. 2 is a perspective view of the first pot extension of the present invention.
Figure 3:
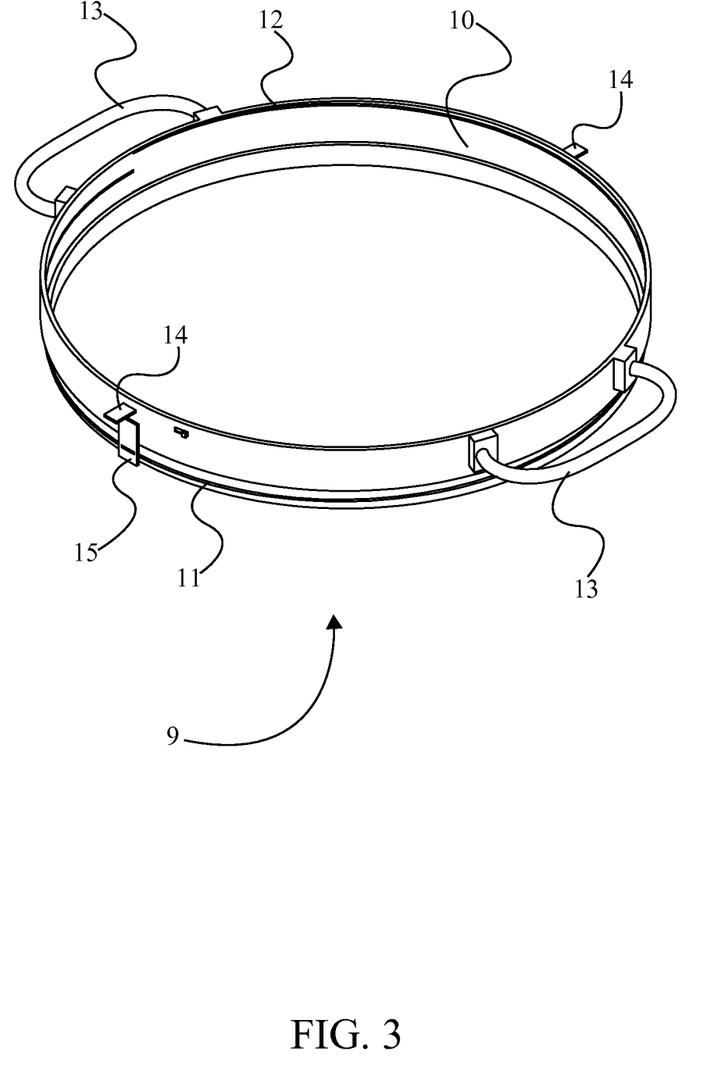
FIG. 3 is a perspective view of the last pot extension of the present invention.

The first pot extension 8 and the last pot extension 9, shown in FIG. 2 and FIG. 3 respectively, each comprise an annular extension wall 10, a pair of handles 13, a plurality of extension latches 14, and a plurality of latch catches 15. The annular extension wall 10 is circular, forming a ring shape with the same radius as the annular pan wall 3. The pair of handles 13 is connected to the exterior of the annular extension wall 10, with the each of the pair of handles 13 located on opposite sides of the annular extension wall 10 from each other. The plurality of extension latches 14 are connected to the exterior of the annular extension wall 10, positioned near the upper edge of the annular extension wall 10. The plurality of latch catches 15 are connected to the exterior of the annular extension wall 10, positioned near the bottom edge of the annular extension wall 10, opposite the plurality of extension latches 14. The annular extension wall 10 further comprises an upper threading portion 12 and a lower threading portion 11. The upper threading portion 12 is positioned adjacent to the top edge of the annular extension wall 10 while the lower threading portion 11 is positioned adjacent to the bottom edge of the annular extension wall 10, opposite the upper threading portion 12.

In the preferred embodiment the annular extension wall 10 is constructed from a heat resistant material, similar to the pan base 2 and annular pan wall 3. This is necessary to withstand any heat transferred to the annular extension wall 10 during cooking. Each of the pair of handles 13 is preferably U-shaped, as with the secondary handle 6 of the pan 1. The pair of handles 13 is preferably coated with a material that has low thermal conductivity. The plurality of extension latches 14 is identical to the plurality of pan latches 7; preferably they are of the spring latch variety, but other embodiments can employ alternatives such as draw latches. As with the pan 1, a moveable latch cover will be laterally movable across the annular extension wall 10. The latch cover will keep the spring latch compressed. When moved aside, the latch cover will allow the spring latch to extend and engage with one of the latch catches 15. Also similar to the pan 1, different implements of latch covers could be used in different embodiments. The plurality of latch catches 15 are preferably tabs with a slot designed to received the spring latch used in the preferred embodiment. When the latch cover is moved aside, the spring latch will extend and traverse through the latch catch. In other embodiments, where a different type of pan latch 7 and extension latch 14 is used, the latch catch 15 will have to be appropriately designed. For example, if a draw latch is used for the pan latch 7 and extension latch 14, then the latch catch 15 would be a tab designed to receive and secure the draw latch.

Though the preferred embodiment uses a first pot extension 8 and last pot extension 9, other embodiments can provide more or fewer pot extensions. The present invention will function with only a pan 1 and first pot extension 8, but can accept more pot extensions as necessary. The height of the provided pot extensions can be varied as well; by providing pot extensions with different heights users will be able to combine the pot extensions to obtain an extended pot with the desired height.

Figure 4:
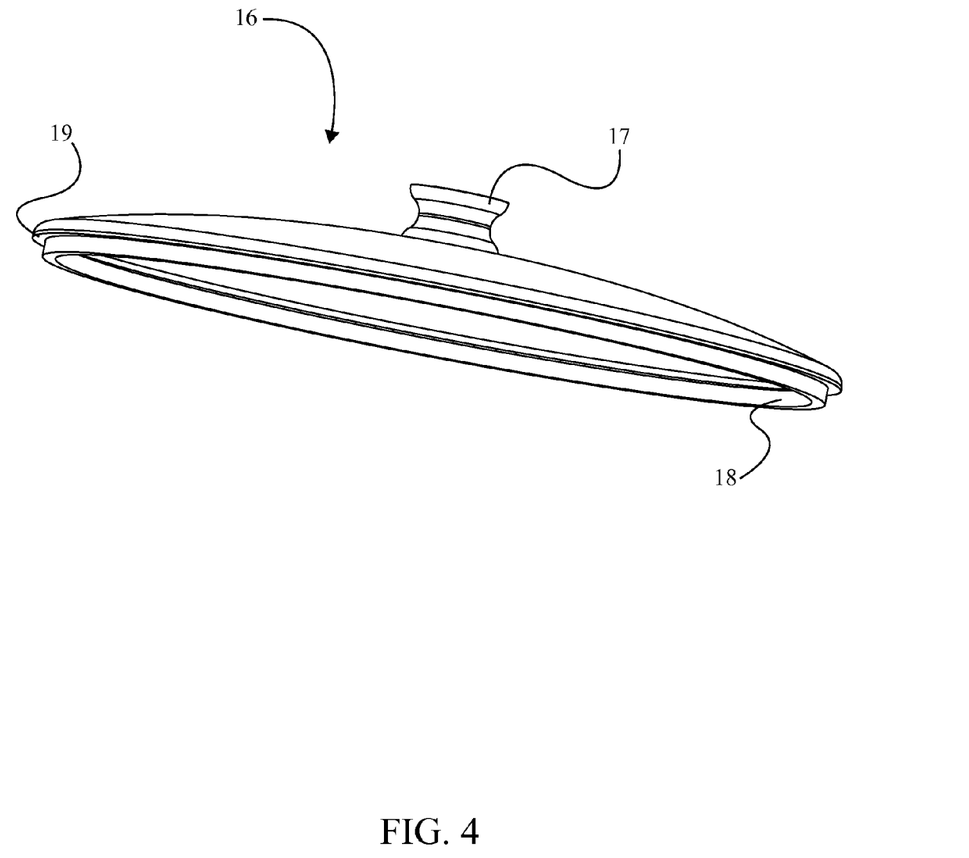
FIG. 4 is a perspective view of the lid of the present invention.

As depicted in FIG. 4, the lid 16 comprises a lid knob 17, a bottom insert 18, and a lip 19. The lid 16 has a parabolic shape, forming a dome that serves to cover the pan 1 and pot extensions. The lid knob 17 is connected to the exterior of the lid 16, centrally positioned on the exterior of the lid 16. The bottom insert 18 is connected to the edge of the lid 16, forming a ring with a radius which is slightly smaller than that of the annular pan wall 3 and annular extension wall 10. The lip 19 is connected to the edge of the lid 16, forming a ring which is perpendicular to the bottom insert 18. The ring formed by the lip 19 has a radius which is slightly larger than that of the annular pan wall 3 and annular extension wall 10.

The lid knob 17 preferably has an indent adjacent to the lid 16, making it easier for a user to grasp the knob and lift the lid 16. As with the handles, the lid knob 17 is preferably made from a material with low thermal conductivity, preventing the lid knob 17 from being heated to the point where it becomes too hot to touch.

The extending pot allows a user to quickly and easily increase the size of a pot to enable using multiple cooking techniques while minimizing clutter. Using an extending pot requires a pan 1, a first pot extension 8, a last pot extension 9, and a lid 16. One of the benefits of the extending pot is that it can be assembled during cooking, although if desired it can be assembled or disassembled prior to cooking.

Cooking with the extending pot begins by only using the pan 1. The pan 1 is placed over a heat source, and a first volume of cooking ingredients is placed in the pan 1. The pan 1 can then be used to cook this first volume of cooking ingredients in the desired manner, such as browning. In the preferred embodiment the first volume of cooking ingredients comprises meat, although in other embodiments different or additional ingredients can be used. For example, meat is sometimes cooked in various types of oil while sugar is often added to accentuate browning. Once the first volume of cooking ingredients has been cooked as desired, the first pot extension 8 can be attached to the extending pot.

Figure 5:
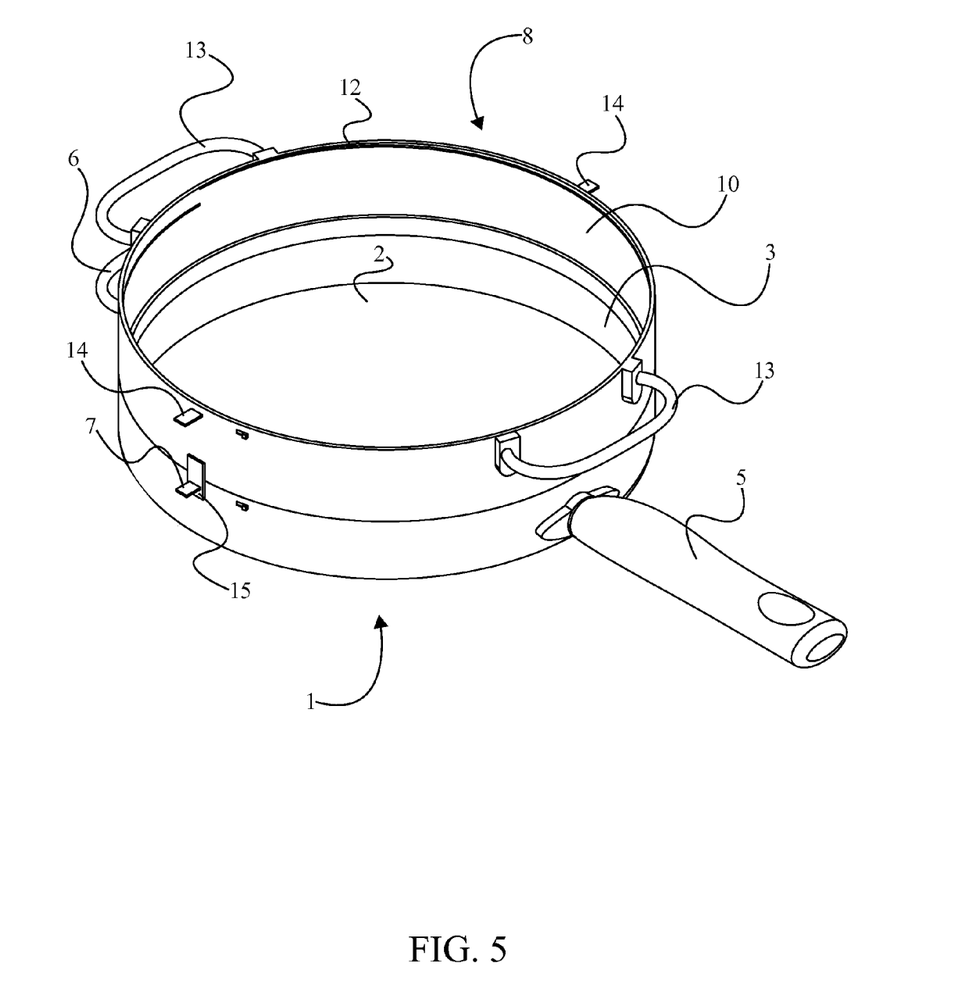
FIG. 5 is a perspective view of the pan and the first pot extension of the present invention.

To connect the first pot extension 8 to the pan 1, the first pot extension 8 is lifted by the pair of handles 13 and placed on the pan 1, such that the annular extension wall 10 of the first pot extension 8 is concentric with the annular pan wall 3. The pan 1 is then secured by removing one hand from the pair of handles 13 and using that hand to hold the elongated handle 5. The second hand, still holding a handle from the pair of handles 13, is then used to rotate the first pot extension 8. Rotating the first pot extension 8 engages the pan threading 4 with the lower threading portion 11 of the first pot extension 8, forming a secure fit between the pan 1 and the first pot extension 8. The second hand can then be removed from the pair of handles 13 and used to engage the pan latches 7 with the latch catches 15 on the first pot extension 8, further securing the first pot extension 8 with the pan 1. In the preferred embodiment this will entail moving the latch covers, allowing the pan latches 7 to extend and traverse through the slots on the tabs of the latch catches 15. In other embodiments, for example those utilizing draw latches, engaging the pan latches 7 and latch catches 15 would simply involve flipping the pan latch 7 down and locking it with the latch catch 15.

Once the first pot extension 8 has been attached to the pan 1, as shown in FIG. 5, the extending pot will have a larger volume in which to cook. At this point a second volume of cooking ingredients, which may have been too much to add to just the pan 1, can be added to the extending pot. In the preferred embodiment the second volume of cooking ingredients comprises vegetables. When cooking meat and vegetables, it is common to cook a meat first. The vegetables are then cooked in the juices from the meat, enhancing flavor. In the preferred embodiment the first volume of cooking ingredients is moved to the sides of the pan base 2 and the second volume of cooking ingredients (i.e. vegetables) are browned in the juices from the first volume of cooking ingredients. In other embodiments, different cooking techniques and foods can be used with the second volume of cooking ingredients. After the second volume of cooking ingredients has been cooked as desired, the last pot extension 9 can be attached to the extending pot.

Figure 6:
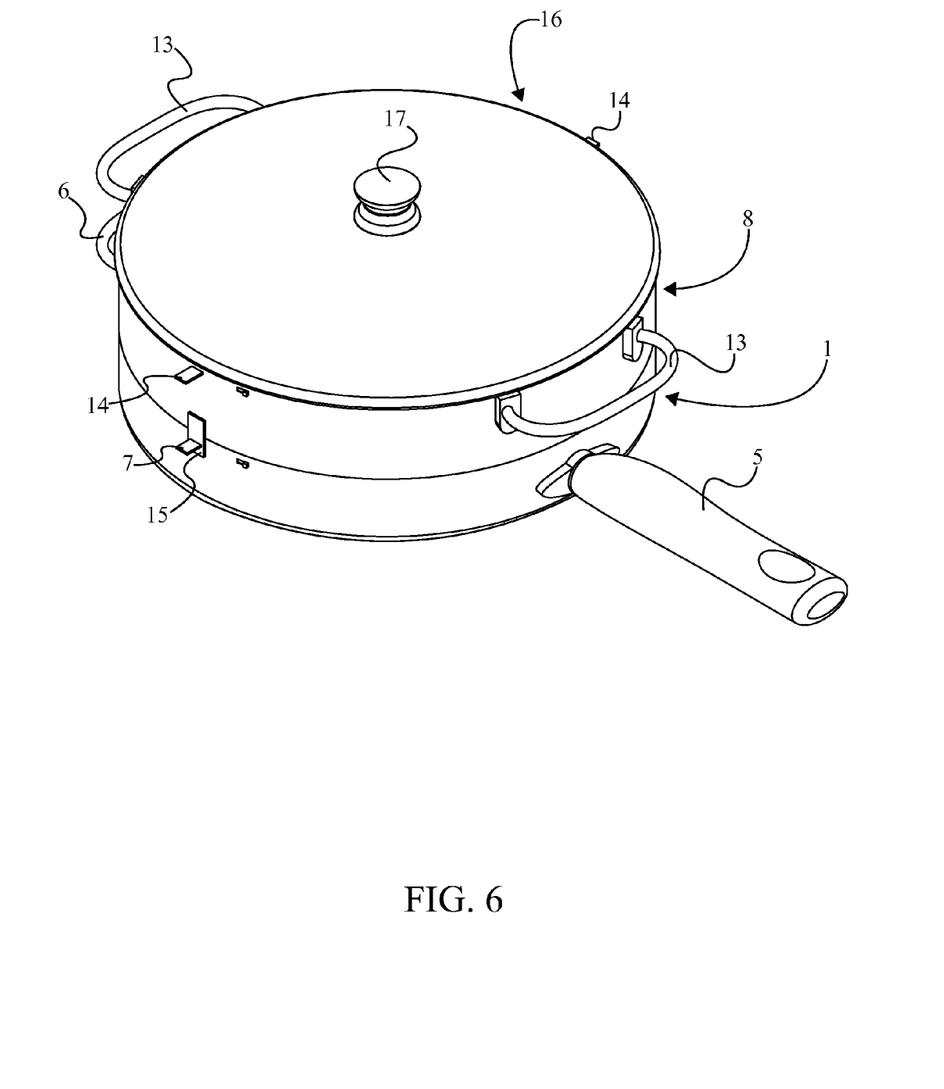
FIG. 6 is a perspective view of the pan, first pot extension, and lid of the present invention.

The last pot extension 9 is connected to the first pot extension 8 in the same manner as the first pot extension 8 is connected to the pan 1. The last pot extension 9 is lifted by its pair of handles 13 and placed on the first pot extension 8, such that the annular extension wall 10 of the last pot extension 9 is concentric with the annular extension wall 10 of the first pot extension 8. A hand is removed from the pair of handles 13 and used to hold the pan 1 by the elongated handle 5. The second hand, still holding one of the pair of handles 13, then rotates the last pot extension 9 to engage the upper threading portion 12 of the first pot extension 8 with the lower threading portion 11 of the last pot extension 9. This secures the last pot extension 9 to the first pot extension 8, further increasing the height of the extending pot. The second hand is then used to engage the extension latches 14 of the first pot extension 8 with the latch catches 15 of the last pot extension 9. In the preferred embodiment, which used spring latches, this entails moving the latch covers so that the extension latches 14 of the first pot extension 8 extend and traverse through the slots on the tabs of the latch catches 15 of the last pot extension 9. In other embodiments, the method of engaging extension latches 14 with the latch catches 15 will depend on the type of latches used. In this manner the last pot extension 9 is further secured to the first pot extension 8.

With, as seen in FIG. 6, the last pot extension 9 attached to the extending pot, there is room to add a third volume of cooking ingredients to the extending pot. In the preferred embodiment, the third volume of ingredients comprises a sauce, which is used to braise the first volume of cooking ingredients and second volume of cooking ingredients. As the third volume of ingredients is added, the first volume and cooking ingredients and second cooking ingredients are mixed together to braise in the third volume of cooking ingredients. In other embodiments, a different cooking technique and third volume of cooking ingredients can be used. Once the third volume of cooking ingredients has been added, the lid 16 can be attached to the extending pot.

Figure 8:
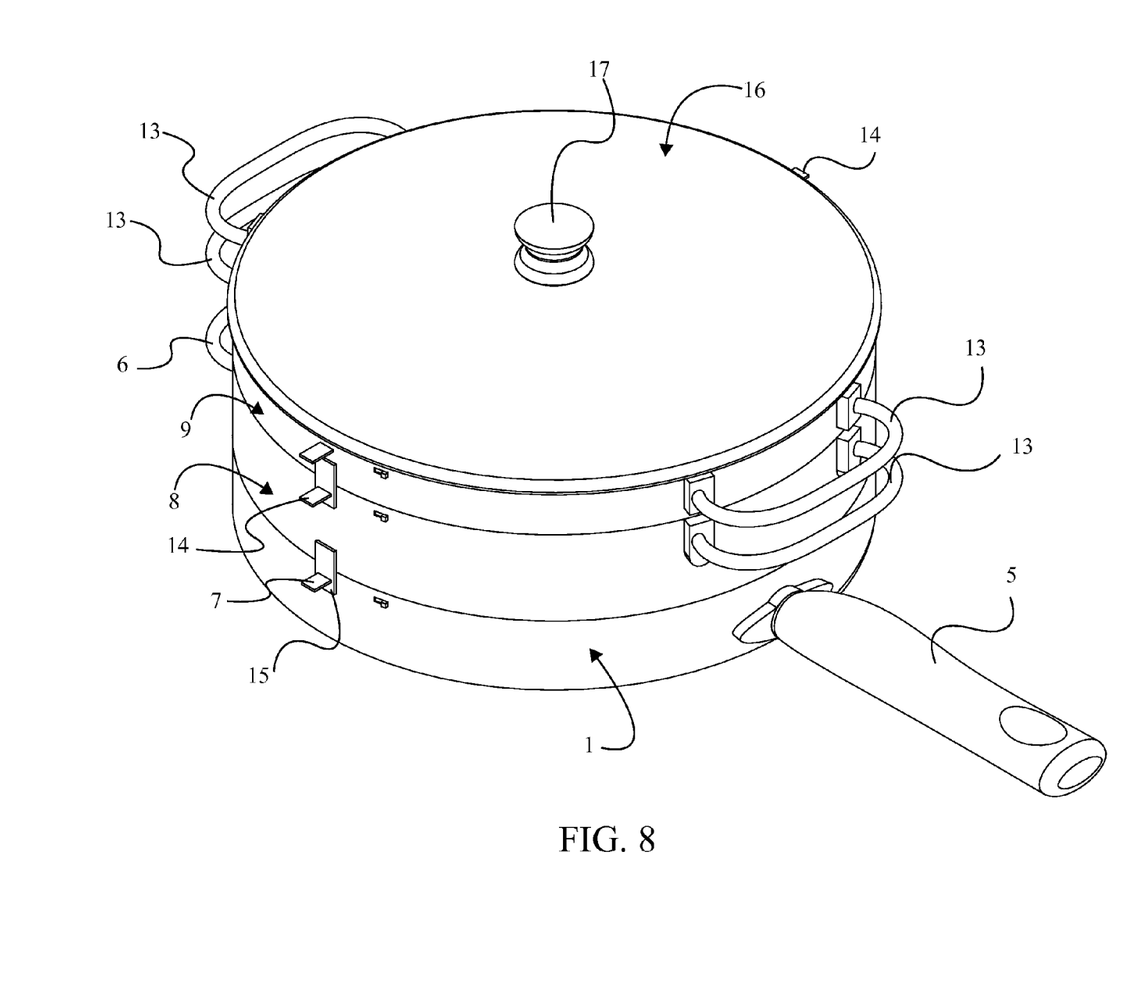
FIG. 8 is a perspective view of the pan, first pot extension, last pot extension, and lid of the present invention.

To attach the lid 16 to the extending pot, the lid 16 is simply lifted by the lid knob 17 and then placed on the last pot extension 9, such that the bottom insert 18 traverses into the last pot extension 9 and the lip 19 rests on top of the annular extension wall 10 of the last pot extension 9, illustrated in FIG. 8. The lip 19 helps to retain moisture inside the extending pot. Depending on what cooking technique is used, it might desired to attach the lid 16 to the extending pot (e.g. for braising and steaming) or to leave the lid 16 off of the pot (e.g. for simmering and deep frying).

In the above manner it becomes possible for a person to use a single extended pot to cook a variable amount of food using varying techniques, adjusting the extended pot on the go rather than needing to prepare multiple types of cookware.

Figure 7:
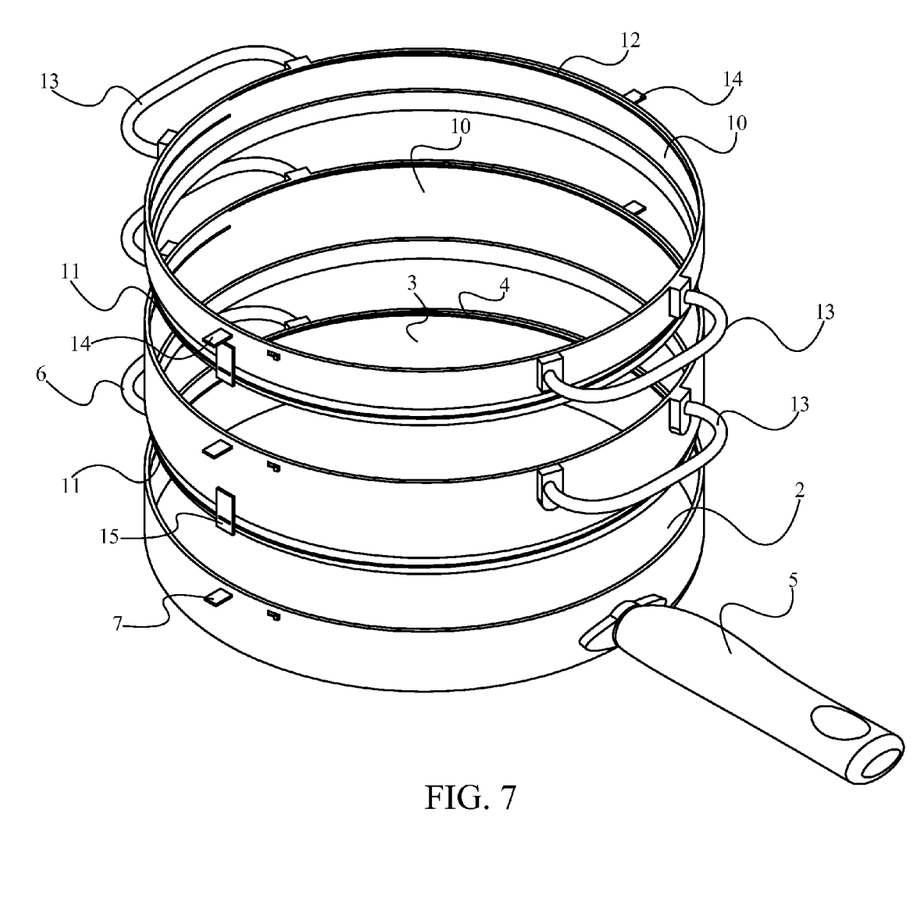
FIG. 7 is an exploded view of the pan, first pot extension, and last pot extension of the present invention.
Figure 9:
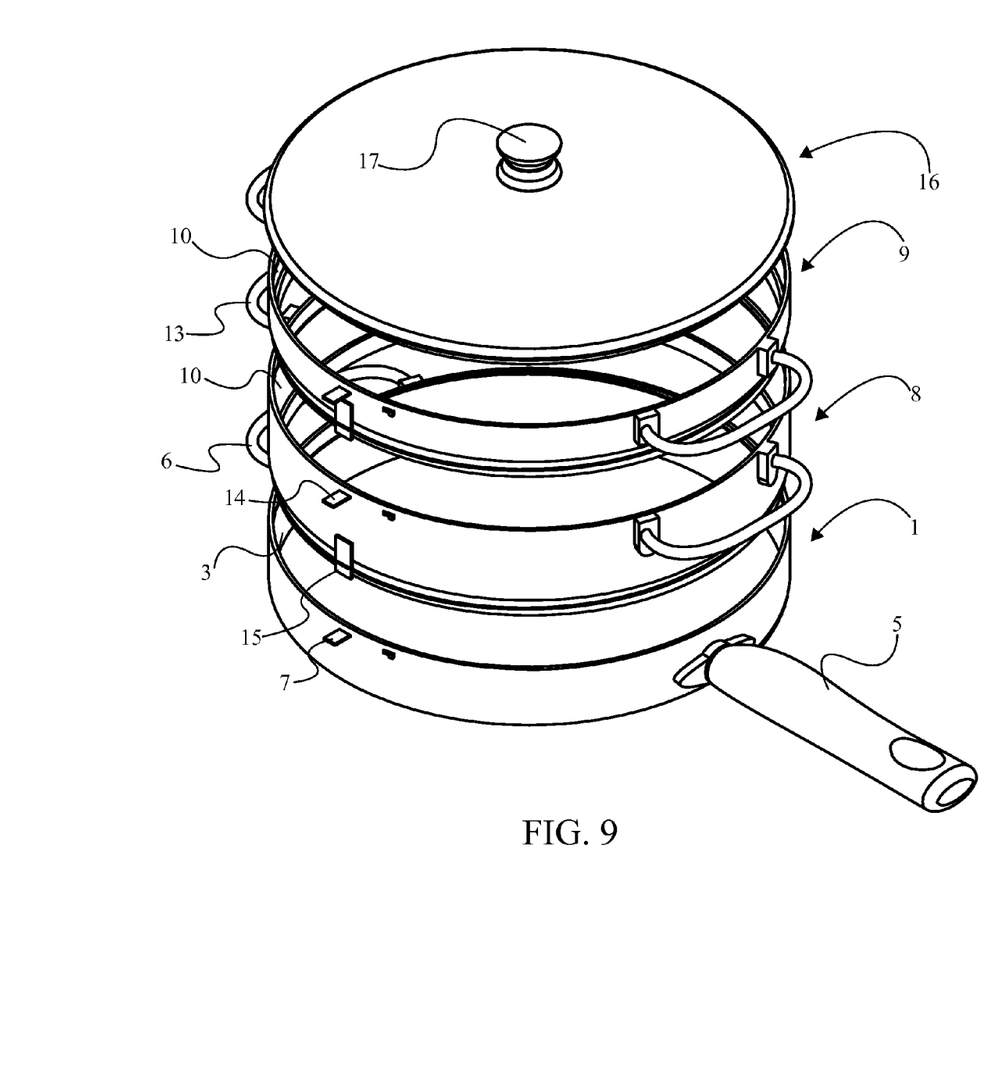
FIG. 9 is an exploded view thereof.

In other embodiments more or fewer pot extensions may be used. For example, if a person wants to stir-fry a large amount of food then the last pot extension 9 would be unnecessary, similar to FIG. 6. Alternatively, if a person wants to boil a large amount of food, it may be necessary to use a second or third pot extension. The modular nature of the extending pot, as depicted in FIG. 7 and FIG. 9, will allow a person to use a number of pot extensions that meets their need.

Although the invention has been explained in relation to its preferred embodiment, it is to be understood that many other possible modifications and variations can be made without departing from the spirit and scope of the invention as hereinafter claimed.

What is claimed is:

1. An extending pot comprises,
a pan;
the pan comprises a pan base, an annular pan wall, an elongated handle, a secondary handle, and a plurality of pan latches;
the annular pan wall comprises a pan threading;
a first pot extension;
a last pot extension;
the first pot extension and the last pot extension each comprise an annular extension wall, a pair of handles, a plurality of extension latches, and a plurality of latch catches;
the annular extension wall comprises an upper threading portion and a lower threading portion;
a lid;
the lid comprises a lid knob, a bottom insert, and a lip;
the first pot extension and the last pot extension being positioned between the pan and the lid;
the first pot extension being attached to the pan;
the last pot extension being attached to the first pot extension;
the lid being attached to the last pot extension;
the annular pan wall being adjacent to the annular extension wall of the first pot extension; and
the annular extension wall of the first pot extension being adjacent to the annular extension wall of the second pot extension.

2. The extending pot as claimed in claim 1 comprises,
the elongated handle being positioned outside and connected to the annular pan wall;
the secondary handle being positioned outside and connected to the annular pan wall;
the elongated handle and the secondary handle being diametrically opposed to each other along the annular pan wall;
the plurality of pan latches being positioned outside the annular pan wall; and
the plurality of pan latches on the annular extension wall being connected adjacent to the annular pan wall.

3. The extending pot as claimed in claim 1 comprises,
the pair of handles being positioned outside and connected to the annular extension wall;
the pair of handles being diametrically opposed to each other along the annular extension wall;
the plurality of latch catches being positioned outside the annular extension wall;
the plurality of latch catches being connected adjacent to the annular extension wall;
the plurality of extension latches being positioned outside the annular extension wall; and
the plurality of extension latches on the annular extension wall being connected adjacent to the annular extension wall.

4. The extending pot as claimed in claim 1 comprises,
the lid knob being centrally positioned outside and connected to the lid;
the bottom insert being positioned inside and concentrically connected to the lid; and
the lip being perpendicularly connected around the bottom insert.

5. The extending pot as claimed in claim 1 comprises,
the pan threading being engaged by the lower threading portion on the first pot extension;
the upper threading portion on the first pot extension being engaged by the lower threading portion on the last pot extension;

the bottom insert traversing into the last pot extension and being encircled by said upper threaded portion; and the lip being parallel and flush with the annular extension wall of the last pot extension.

6. The extending pot as claimed in claim 1 comprises, the plurality of pan latches being engaged by the plurality of latch catches on the first pot extension; and the plurality of extension latches on the first pot extension being engaged by the plurality of latch catches on the second pot extension.

7. An extending pot comprises, a pan;

the pan comprises a pan base, an annular pan wall, an elongated handle, a secondary handle, and a plurality of pan latches;

the annular pan wall comprises a pan threading;

a first pot extension;

a last pot extension;

the first pot extension and the last pot extension each comprise an annular extension wall, a pair of handles, a plurality of extension latches, and a plurality of latch catches;

the annular extension wall comprises an upper threading portion and a lower threading portion;

a lid;

the lid comprises a lid knob, a bottom insert, and a lip;

the first pot extension and the last pot extension being positioned between the pan and the lid;

the first pot extension being attached to the pan;

the last pot extension being attached to the first pot extension;

the lid being attached to the last pot extension;

the annular pan wall being adjacent to the annular extension wall of the first pot extension;

the annular extension wall of the first pot extension being adjacent to the annular extension wall of the second pot extension;

the plurality of pan latches being positioned outside the annular pan wall;

the plurality of pan latches on the annular extension wall being connected adjacent to the annular pan wall;

the plurality of latch catches being connected adjacent to the annular extension wall;

the plurality of extension latches on the annular extension wall being connected adjacent to the annular extension wall;

the pan threading being engaged by the lower threading portion on the first pot extension;

the upper threading portion on the first pot extension being engaged by the lower threading portion on the last pot extension;

the bottom insert traversing into the last pot extension and being encircled by said upper threaded portion;

the lip being parallel and flush with the annular extension wall of the last pot extension;

the plurality of pan latches being engaged by the plurality of latch catches on the first pot extension; and the plurality of extension latches on the first pot extension being engaged by the plurality of latch catches on the second pot extension.

8. The extending pot as claimed in claim 7 comprises, the elongated handle being positioned outside and connected to the annular pan wall;

the secondary handle being positioned outside and connected to the annular pan wall; and the elongated handle and the secondary handle being diametrically opposed to each other along the annular pan wall.

9. The extending pot as claimed in claim 7 comprises, the pair of handles being positioned outside and connected to the annular extension wall;

the pair of handles being diametrically opposed to each other along the annular extension wall;

the plurality of latch catches being positioned outside the annular extension wall; and the plurality of extension latches being positioned outside the annular extension wall.

10. The extending pot as claimed in claim 7 comprises, the lid knob being centrally positioned outside and connected to the lid;

the bottom insert being positioned inside and concentrically connected to the lid; and the lip being perpendicularly connected around the bottom insert.

* * * * *